370-106 SR

XR 3,591,720

[redacted]

SEARCH ROOM

BEST AVAILABLE COPY

[11] 3,591,720

[72] Inventor Friedrich-Ernst Othmer
Nurnberg, Germany
[21] Appl. No. 869,317
[22] Filed Oct. 24, 1969
[45] Patented July 6, 1971
[73] Assignee U.S. Philips Corporation
New York, N.Y.
[32] Priority Oct. 26, 1968
[33] Germany
[31] P 18 05 463.2

[54] METHOD OF SYNCHRONIZING A RECEIVER
1 Claim, 5 Drawing Figs.

[52] U.S. Cl. 178/69.5 R, 179/15 BS, 340/172.5
[51] Int. Cl. H04l 7/08, H04j 3/06
[50] Field of Search 178/69.5; 179/15 BS; 340/172.5

[56] References Cited
UNITED STATES PATENTS

| | | | |
|---|---|---|---|
| 3,065,302 | 11/1962 | Kaneko | 179/15 BS |
| 3,187,261 | 6/1065 | Matsushima | 179/15 BS |

*Primary Examiner*—Robert L. Griffin
*Assistant Examiner*—John C. Martin
*Attorney*—Frank R. Trifari

ABSTRACT: A method for synchronizing a receiver to a bit-stream which is divided into blocks having a constant number of bits, each block having at least two different synchronizing bits arranged in synchronization-bit pattern periodically repeated from block to block, which method includes the steps of comparing a first divisional sequence consisting of a series of bits lying spaced apart by equal first distances with a locally generated signal until equality is found, and then comparing each bit of a second divisional sequence with the most recently selected bit of the first sequence until inequality is found.

3591720

BEST AVAILABLE COPY

INVENTOR.

FRIEDRICH-ERNST OTHMER

BY

AGENT

BEST AVAILABLE COPY

PATENTED JUL 6 1971 3,591,720

INVENTOR.
FRIEDRICH-ERNST OTHMER
BY
AGENT

INVENTOR.
FRIEDRICH-ERNST OTHMER
BY
AGENT

BEST AVAILABLE COPY

METHOD OF SYNCHRONIZING A RECEIVER

The invention relates to a method of synchronizing a receiver to a bitstream divided into blocks of a constant number of bits, each block having at least two different synchronizing bits arranged in synchronization-bit pattern periodically repeated from block to block.

Such methods are of importance for data transmission systems and PCM-systems.

With multichannel PCM-systems various methods are known for inserting synchronizing information into the information bitstream. Distinction may be made between brunched synchronization in which the synchronizing bits are arranged in one channel interval, for example, in the 32nd channel interval of a 32-channel system and dispersed syncronization in which the synchronizing bits are distributed in a block where, for example, the synchronizing bits are arranged at the 8th bit positions of the channels.

The known synchronization methods are all based on finding and recognizing a predetermined synchronization-bit pattern in the bitstream. When from two or more base-bitstreams a multiplex-bitstream is formed, the synchronization-bit pattern varies so that the device for carrying out the method has to be varied.

The invention has for its object to provide a universally applicable block-synchronization method which is independent of the degree of multiplexing of the bitstream when in the formation of multiplex-bitstreams given rules are observed, that is to say, a block-synchronization method generally applicable to a given class of multiplex-bitstreams so that for all multiplex-bitstreams of this class the same device for carrying out the method can be employed.

The synchronization method according to the invention is characterized in that the synchronization process is divided into two distinct time-successive phases, in which in the first phase from an arbitrary bit position in the bitstream a first divisional sequence consisting of a series of bits spaced apart by equal first distances in the bitstream is selected and each bit associated with the first divisional sequence is temporarily stored and the portion of said first divisional sequence which is formed by a predetermined number of most recently selected bits is compared after each selection of a bit of the first divisional sequence with a locally produced comparison sequence until equality is found between said portion of the first divisional sequence and the comparison sequence and in the event of lack of equality within a given first time limit the first phase is repeated from a bit position associated with a different first divisional sequence so that, if constantly within said first time limit no equality is found, the various possible first divisional sequences are selected in cyclic order of succession on the understanding that, if only one first divisional sequence is possible, said first time limit is rendered inoperative and in the case of equality within said first time limit the second phase of the synchronization process is started, in which from the bit position of the most recently selected bit of the portion of the first divisional sequence which corresponds with the comparison sequence a second divisional sequence consisting of a series of bits spaced apart by equal second distances in the bitstream is selected and each bit of the second divisional sequence is compared with the last-mentioned, most recently selected bit of the first divisional sequence until for the first time unequality is found and in the event of lack of unequality within a given second time limit the synchronization process is repeated, starting by the first phase, and when unequality is found for the first time within said second time limit the receiver is synchronized to a bit position which has a predetermined position relative to the bit position of the second divisional sequence in which the unequality is found.

This synchronization method will be set out more fully hereinafter.

The starting point of the synchronization method is a bitstream divided into blocks having a constant number of bits. The length of a block expressed in the number of bit positions is designated by $b$. In each block the bit positions are progressively numbered from 0 to $b-1$. The bit positions of each block are occupied by two types of bits. The bits of the first type are bits which may be different from block to block. These bits are termed the information bits. The bits of the second type are bits which are the same from block to block and are termed the synchronizing bits.

Figure 1:
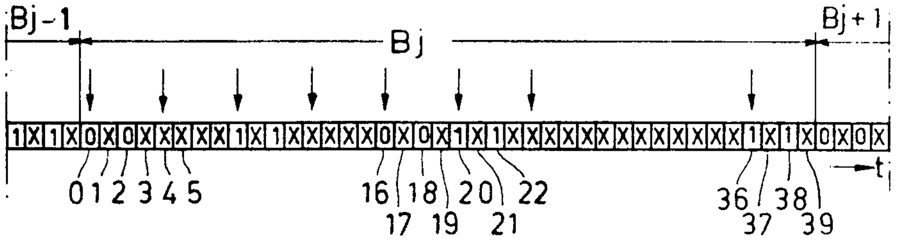
FIG. 1 is an example of a block of data including synchronization signals.

FIG. 1 illustrates an example of a block $B_j$ of 40 bit positions plotted on the time axis. The information bits are designated by the symbol $x$ and the synchronizing bits by the symbols 0 and 1. By this notation a block may be considered to be a synchronization combination consisting of a sequence $S_o$, $S_1$, $S_2 2$, ... $S_{b11}$ of $b$ symbols of the group of symbols 0, 1 and $x$. According to this aspect the bitstream consists of a periodic sequence of symbols $S_n$, which comprises in one period the sequence of symbols $S_o$, $S_1$... $S_{b11}$. The period of $S_n$ in terms of the number of symbols is $b$.

It will be assumed that $b$ is the smallest period of $S_n$, that is to say that the symbol sequences $S_o$, $S_1$, ... $S_{b11}$ Cannot be divided into two or more divisional sequences forming a periodical prolongation of each other. An arbitrary symbol of the sequence $S_o$, $S_1$, ... $S_{b11}$ is indicated by $S_k$, wherein $k$ is the number of the position. $S_k=x$ means that at the position $k$ no synchronizing bit is found and $S_k$ $x$ means that at the position $k$ a synchronizing bit is found. In the block $B_j$ shown in FIG. 1 $S_k \neq x$ for the following values of $k$:

$k$=0, 2, 8, 10, 16,1820, 22, 36, 38 whereas $S_k=x$ for all other values of $k$. Of the 40 bits of the block $B_j$ 10 are synchronizing bits and 30 are information bits.

The synchronization method requires the synchronization combination to contain at least once each of the symbols 0 and 1 and requires the smallest distance between the symbols 0 and 1 in terms of numbers of bit positions to be dividable on all relative distances between the symbols $S_k$ $x$. These requirements are satisfied by the synchronization combination illustrated in FIG. 1.

In order to determine the smallest distance between the symbols 0 and 1 and, in general, to determine which symbol is located at a given distance before or after a given symbol, the synchronizing combination should be considered to be closed to a ring so that the position $k=b-1$ joins the position $k=0$. For the same of simplicity the preceding and the succeeding synchronizing combinations $B_{j11}$ and $B_{+1}$ of FIG. 1 may be used in determining the distances.

The smallest distance between the symbols 0 and 1 in the synchronization combination shown in FIG. 1 is found between the symbol 0 at the position $k=0$ and the symbol 1 at the position $k=38$, as well as between the symbol 0 at the position 18 and the symbol 1 at the position 20. This smallest distance amounts to two bit positions. The relative distances between the symbols $S_k \neq x$ are all multiples of 2 so that the above requirement of divisibility is satisfied. The requirement of divisibility should not be taken too strictly. If, for example, in the synchronizing combination of FIG. 1 the symbol at position 31 is a 1, $S_{31}=1$, the synchronization combination may nevertheless be used, but this synchronizing bit $S_{31}$ is then not used in the synchronization method, so that it has become superfluous. For the synchronization method it is then indifferent when $S_{31}$ is chosen to be equal to $x$.

The aforesaid smallest distance between the symbols 0 and 1 is indicated by $do$. This distance is the greatest common divisor of all relative distances between the symbols $S_k \neq x$.

The requirements mentioned above for the synchronization combination may be formulated as follows: Determine all positions $k$, for which applies $S_k \neq x$. Determine the relative distances between these positions and determine the greatest common divisor *do* of these distances. The synchronizing combination should then contain at least one pair of symbols 0 and 1 at the distance *do*. In the synchronizing combination of FIG 1 two of such symbol pairs are found, i.e at the positions 0 and 38 and the positions 18 and 20.

For illustrating the structure of the synchronization combination as far as it is important for the synchronization method a second characteristic distance $d_1$ is derived.

For determining the distance $d_1$ all positions *k* are determined for which $S_k$ $S_{k1do}$, that is to say the positions *k* whose symbols differ from the symbols at the positions *k—do* preceding the former by a distance *do*. In the synchronization combination of FIG. 1 this unequality is satisfied in the positions indicated by the arrows, where *k* has the following values:

$k$=0, 4, 8, 12, 16, 20, 24, 36.

The positions where the unequality $S_k \neq S_{k1do}$ is satisfied, are briefly termed unequality positions.

The distance $d_1$ is the greatest common divider of the relative distances between the unequality positions. In the synchronization combination of FIG. 1 the distance $d_1$ is 4 bit positions.

The structure of the periodical sequence $S_n$ can be described as follows by means of the distances *do* and $d_1$. When the periodic sequence $S_n$ is divided into intervals of the length $d_1$ so that the unequality positions are located at the beginning of an interval and the intervals are divided into subintervals of the length *do*, each interval contains either no symbols 0 or 1 at all or equal symbols 0 or 1 at the beginning of each subinterval. This structure of the periodic sequence $S_n$ is illustrated for the synchronization combination of FIG. 1 in FIG. 2. For the synchronization combination of FIG. 1 *do*=2 and $d_1$=4. The number of symbols of the synchronization combination is 40. The synchronizing combination may therefore be divided into 10 intervals $I_0$ to $I_9$ of the length $d_1$. Each interval may be divided into two subintervals $i_0$ and $i_1$ of the length *do*.

The intervals $I_1$, $I_3$, $I_6$, $I_7$ and $I_8$ do not contain symbols 0 or 1. The other intervals contain at the beginning of the subintervals $i_0$ and $i_1$ equal symbols 0 or 1.

In the synchronizing method the unequality positions for which applies: $S_k$=1 and $S_{k1do}$=0 or $S_k$=0 and $S_{k1do}$=1 play a particular role. In the synchronization combination of FIG. 1 these are the positions $k$=0 and $k$=20.

The synchronization method has for its object to find one of these particular unequality positions. This one particular unequality position is termed to search position. If a synchronization combination comprises two or more particular unequality positions, one of them is determined to be the search position. The position number thereof is designated by *ko*. The synchronizing combination shown in FIG. 2 has two particular unequality positions, i.e. for $k$=0 and $k$=20. Of these unequality positions the position with $k$=0 is determined to be the search position, so that *ko*=0.

In general, it is not necessary for the search position to be located at the beginning of the block. All following considerations apply to any arbitrary number *ko*.

In the following it will be assumed that the bitstream or the periodic sequence of symbols $S_n$ is divided, be it imaginarily, starting from the position *ko* in a block or synchronization combination into intervals of the length of $d_1$ bit positions and each interval is divided into subintervals of the length of *do* bit positions, wherein *do* and $d_1$ have aforesaid values. These intervals are briefly termed $d_1$-intervals and the subintervals are termed *do*-intervals. The search position with the number *ko* is briefly termed the *ko*-position and without detracting from the generalization it may be assumed that the *ko* position is the first position of a block or synchronization combination. A block comprises $d/d_1$ $d_1$-intervals and each $d_1$-interval comprises $d_1/do$ *do*-intervals.

The particular significance of a $d_1$-interval of the bitstream resides in that this interval does not comprise synchronizing bits at all or that it comprises equal synchronizing bits at the beginning of each *do*-interval. The $d_1$-interval will now be considered which is the last of a sequence of $d_1$-intervals beginning at a *ko*-position and terminating at the next-following *ko*-position In FIG 2 this is the $d_1$-interval $I_9$ of the synchronization combination B*j* immediately preceding the *ko*-position (*ko*=0) of the synchronizing combination $B_{j+1}$.

Figure 2:
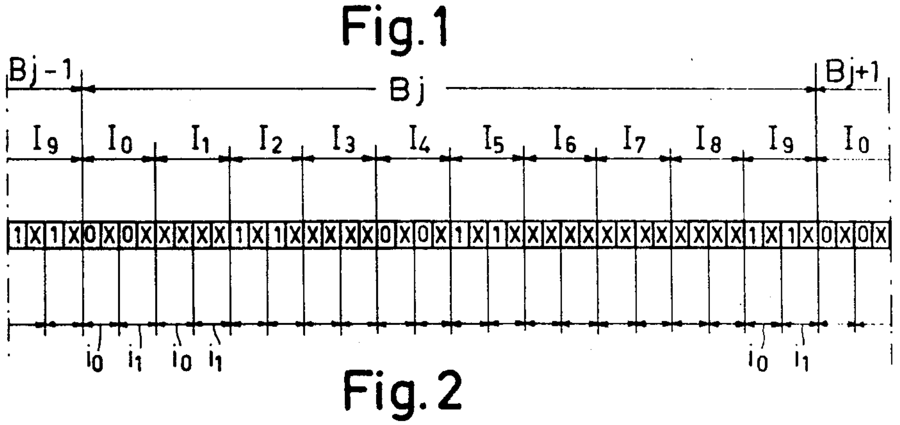
FIG. 2 shows how the block may be subdivided in accordance with the method of the invention.

As stated above, a *ko*-position is a position to which applies that: $S_k$=1 and $S_{k1do}$=0 or $S_k$=0 and $S_{k1do}$=1. In FIG. 2 $S_{ko}$=0 and $S_{ko1do}$=1. The symbol $S_{ko1do}$ is located at the beginning of the last *do*-interval of the sequence of $d_1$-intervals under consideration. In the case of FIG. 2 it is located at the beginning of the *do*-interval $i_1$ of $d_1$-interval $I_9$. The $d_1$-interval immediately preceding a *ko*-position is distinguished from the other $d_1$-intervals in that this $d_1$-interval comprises at any rate synchronizing bits, which differ from the synchronizing bit at the *ko*-position. This $d_1$-interval is termed the *ko*, $d_1$ interval. In FIG. 2 this is the $d_1$-interval $I_9$.

In the bitstream receiver a clock generator produces a time parameter *t*, which progresses through the series of natural numbers and is raised by 1 at the reception of each bit. The symbol received at the time *t* is designated by $A_t$. In the synchronization process the object is to determine which value *t* modulo *b* corresponds to *ko*. *t* modulo *b* is the positive residue left by the division of *t* by *b*. In a practical receiver *t* will periodically follow the sequence of numbers 0, 1, 2,...*b*—1 so that instead of *t* module *b t* may be taken, wherein *t*=0, 1,...*b*—, 0, 1,....

A $d_1$-divisional sequence of incoming sequence $A_t$ is a sequence of symbols selected therefrom at equal distances $d_1$. Since within a $d_1$-interval there are as many possibilities of beginning a $d_1$-sequence as there are bit intervals in a $d_1$-interval, the number of different $d_1$-divisional sequences is equal to the number of bit intervals of a $d_1$-interval. The portion of a $d_1$-sequence which is formed by the last $N$+1 symbols:

$$A_{t-Nd_1},\ A_{t-(N-1)d_1},\ A_{t-(N-2)d_1},\ \ldots\ A_t$$

is termed the head of the $d_1$-divisional sequence. At each increase of the time parameter *t* by $d_1$, the head changes by the addition of a new symbol at the front and by the elimination of a symbol at the rear.

The sequence of $N$+1 symbols:

$$S_{ko-(N+1)d_1},\ S_{ko-Nd_1},\ S_{ko-(N-1)d_1},\ \ldots\ S_{ko-d_1}$$

is termed the comparison sequence. For the synchronizing combination of FIG. 2 with $N$=9, the comparison sequence is:

0×1×0 1×××1.

In general the number of symbols $N$+1 of the comparison sequence and the head of the $d_1$-divisional sequence need not be equal to the number of $d_1$-intervals of a block. In the case of FIG. 2 N may be higher or lower than 9, at will.

If for a given value $t_o$ of the time parameter *t* the head of the $d_1$-divisional sequence concerned is symbol by symbol equal to the comparison sequence at all positions where the comparison sequence comprises the symbol 0 or 1 and if the incoming bitstream does not contain errors, it may be assumed that the symbol $A_{to}$ appearing at the instant $t_o$ lies at the beginning of a *do*-interval of a *ko*, $d_1$-interval.

The comparison sequence is a sequence determined by the synchronization combination employed and can be produced in some way or other in the receiver for comparison with the head of a $d_1$-divisional sequence.

A *do*-divisional sequence of the incoming sequence $A_t$ is a sequence of symbols selected therefrom at equal distances *do*. The beginning of a *do*-divisional sequence is always chosen to be the position of the symbol $A_{to}$. When $A_{to}$ lies at the beginning of a *do*-interval of a *ko*, $d_1$-interval, the *do*-divisional sequence consists of a sequence of the same symbols 0 or 1, followed by the symbols $S_{ko}$ differing therefrom. This sequence of equal symbols contains at the most *dt/do* symbols, where the symbol $A_{to}$ is considered to be the first symbol of the *do*-divisional sequence. This maximum is reached when $A_{to}$ lies at the beginning of the first *do*-interval of a *ko*, $d_1$-interval. In the case of FIG. 2 the *do*-divisional sequence is 110, when $A_{to}$ lies at the beginning of the *do*-interval $i_0$ of the $d_1$-interval $I_9$ and the *do*-divisional sequence is: 10, when $A_{to}$ lies at the beginning of the *do*-interval $i_1$.

The synchronization of the receiver is performed in two phases I and II.

PHASE I

In this phase, starting from an arbitrary value of the time parameter $t=t_i$ a $d_1$-divisional sequence is selected from the incoming sequence $A_t$ and the symbols of this $d_1$-divisional sequence are stored until a head of $N+1$ symbols is formed. This head of the $d_1$-divisional sequence is compared symbol by symbol with the comparison sequence generated in the receiver at all those positions where the comparison sequence contains the symbol 0 or 1. The positions where information bits occur in the comparison sequence are therefore not included in the comparison. If no equality occurs at said positions, again a symbol of the $d_1$-divisional sequence is selected from the incoming sequence and the resultant head of the $d_1$-divisional sequence is compared with the comparison sequence. This is repeated until equality is found or until a given time limit is reached in accordance with what occurs first. If prior to reaching the time limit no equality is found the receiver passes by changing the selection instants, to a different $d_1$-divisional sequence and the comparison process is repeated until equality is found or until the time limit is reached.

It should be noted that if $d_1=1$ and if the bitstream is received without errors, it is not possible for the equality not to occur finally. The use of the time limit may then be dispensed with.

If constantly no equality is found, within the time limit the various possible $d_1$-divisional sequences are selected in cyclic order of succession until finally at all places concerned equality between the head of the $d_1$-divisional sequence and the omparison sequence is found. By the termination of phase L a value $t_o$ of the time parameter is determined, which may be assumed to indicate the beginning of a *do*-interval of a *ko*, $d_1$-interval.

The number of symbols of the comparison sequence and of the head of the $d_1$-divisional sequence is in general assumed to be $N+1$. When $N+1$ is chosen to be equal to the number of $d_1$-intervals of a block, the comparison sequence occupies the whole block. With a great block length *b* this will give rise to a high capacity of the storage for storing the head of the $d_1$-divisional sequence. In these cases the synchronization combination is preferably chosen so that a significant portion of the synchronization bite are located in the last $d_1$-intervals of the block in order that the comparison sequence may be restricted to these $d_1$-intervals.

PHASE II

After the termination of Phase I, the *do*-divisional sequence is selected which is associated with the resultant value $t_o$ of the time parameter. In this divisional sequence the first symbol differing from $A_{to}$ is detected, which consequently is assumed to be the symbol $S_{ko}$. Thus the *ko*-position and hence the beginning of a block are determined. If within a given time limit no change occurs in the *do*-divisional sequence, the synchronization process is repeated from phase I.

In the state in which the receiver is in synchronism with the blocks of the bitstream, the synchronization state can be continuously monitored by testing each block with respect to the presence of the synchronization combination.

In practical embodiments of transmission systems the transmitted bitstream exhibits errors. The bit errors may affect the synchronization process and even a nonsynchronous state may be simulated. Finding equality between the head of a $d_1$-divisional sequence and the comparison sequence may be rendered difficult by the appearance of errors. This has to be considered in determining the criteria for starting the synchronizing process and the determination of the time limit in phase I. It may furthermore be found to be more effective in practice not to require as a criterion for terminating phase I equality at all positions concerned, but only to require it in the majority of these places. The criteria for testing whether the receiver is in the synchronization state or not may be different dependent on the practical circumstances. The determination of these criteria is not a subject-matter of this Application.

The synchronization method is completely independent of the number of *do*-intervals in a $d_1$-interval. For the synchronization method it is completely indifferent whether the synchronization combination in each $d_1$-interval contains 1, 2, 3 or more *do*-intervals. In the case of FIG. 2 it is unessential for the synchronization method that each $d_1$-interval contains 2 *do*-intervals. Nothing is varied in the synchronization method when this number $d_1/do$ is 1, 2, 3, 4 or more. It is only of interest that the synchronization combinations should all have the same comparison sequence, since it is only this sequence which is generated in the receiver.

From the structure a given basic synchronization combination structures of higher order may be derived by multiplying by an arbitrary factor *n* the number of *do*-intervals in each $d_1$-interval of the basic synchronization combination. All structures of higher order derived in this way from the same basic structure form a class of structures. For all structures of this class the same synchronization method can be employed.

In order to form a multiplex-bitstream current from two or more base-bitstreams simultaneously occurring bit groups of the various base-bitstreams are arranged in time-succession whilst the bit-duration is reduced. If each bit group comprises one bit, the term bit multiplex is used. In the other cases the term word multiplex or block multiplex is used. The latter applies when a bit group comprises a whole block.

Figure 3:
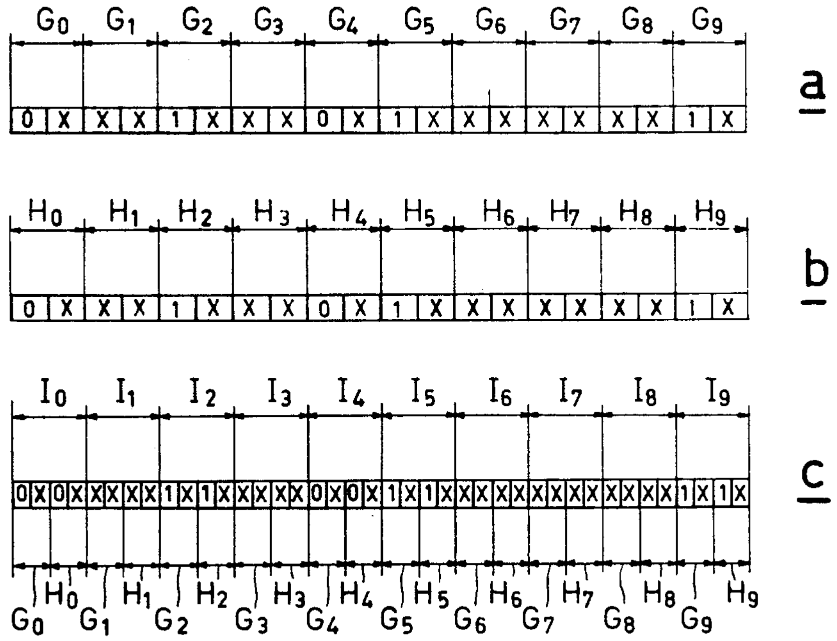
FIG. 3 is another illustration of the method of the invention.

By multiplexing in such a manner that the structure of the multiplex-bitstream or multiplex synchronization combination is associated with the said class, it is achieved that for all multiplex-bitstreams the same synchronizing method can be used as for the base-bitstream. A simple method of realizing this is that the bits lying in a $d_1$-interval are taken as a bit group and the base bitstreams are interleaved such that the bit groups of equally numbered $d_1$-intervals of the various base-bitstreams are put in time-succession in the multiplex-bitstream. This method is illustrated in FIG. 3 by an example. FIG. 3*a* shows the synchronization combination of a first base-bitstream. This synchronization combination comprises the $d_1$-intervals $G_o$ to $G_9$.

In this case it applies that $d_1=do$. FIG. 3*b* shows the identical synchronization combination of a second base-bitstream. The $d_1$-intervals thereof are indicated by $H_o$ to $H_9$. The synchronization combination of the multiplex-bitstream obtained from these two base-bitstreams by the describing of multiplexing method is shown in FIG. 3*c*. The example is chosen such that the latter synchronization combination is identical to the synchronization combination of FIG. 2.

It will be illustrated with reference to two examples how synchronizing combinations suitable for practical use are determined.

EXAMPLE 1

This is based on K pulse-code-modulated information signals with *n* bits per pulse code group and a repetition frequency of the pulse-code groups $f_o=1/T_o$. To each information signal Z signalling channels have to be added. For the base-bitstream ($K=1$) a base synchronizing combinations $\bar{S}_o$, $S_1$, $S_2$, . . . $S_{bo-1}$ is chosen, in which $\bar{do}=\bar{d}_1=n+1$. The dash above the references *do* and $d_1$ means that they refer to the base synchronization combination. The number of $d_1$-intervals of the base synchronization combination is assumed to be *No* so that from the block length *bo* applies that: $bo=No\cdot d_1=No\cdot(n+1)$.

From the K pulse-code-modulated information signals is formed by the multiplexing method described above a K-channel multiplex signal. The multiplex synchronization combination of this multiplex signal consists of *No*. $d_1$-intervals, each having K *do*-intervals, wherein $do=d_1=n+1$ and $d_1=K\cdot(n+1)$.

If it is ensured that the sequence of symbols formed by the first symbols of the $d_1$-intervals of the base synchronizing combination comprises Z-times the symbol $x$, the first position of each $do$-interval in the corresponding $d_1$-intervals of the multiplex synchronization combination may be employed for the transmission of signalling information. The bit repetition frequency $Vo$ of each signalling channel is $Vo=fo/No$.

For the sequence of first symbols of the $d_1$-intervals of the base synchronizing combination there may be chosen $q$ consecutive groups of $p+1$ symbols: (O, X, ....X) and a last group of $p+1$ symbols (1.,1, ,,, 1), wherein $p$ and $q$ are two arbitrary integers, to which applies that $p-q=Z$. This sequence then comprises exactly Z-times the symbol $x$. In this case it applies that $No=(p1)\cdot(q+1)$.

The numbers $p$ and $q$ may be determined so that in considering the condition that $Z=p\cdot q$, $No$ is a minimum and $Vo$ is a maximum. This is the case when $p$ or $q$ is chosen to approach as far as possible $Z\ exp\ ½$. For $Z=4$ there is chosen $p=q=2$. The base synchronization combination is then:
(O, X,...X), (X, X,...X), (X, X,...X) (O, X,...X), (X, X,...X), (X, X,...), (1, X,...X), (1, X, X,...X), (1, X,...X), wherein X,...X represents a group of $n$ symbols X. As a comparison sequence during phase 1 of the synchronization process preferably the sequence 1, 1, 1 is used for saving storage capacity. This sequence being formed by the symbols at the beginning of the last $3(=p+1)$ $d_1$-intervals of the multiplex synchronization combination.

EXAMPLE 2

The starting point is a base multiplex signal for $Ko$ pulse-code-modulated information signals having $n$ bits per pulse-code group and $KoZ$ signalling signals.

A frame is the smallest portion of a block in which one pulse code group of each information signal is located and a subframe is the smallest portion of a frame in which one bit of each information signal is located. The term subframe is particularly significant in bit multiplexing.

A block of the base multiplex signal consists, for example, of $Z+1$ frames and each frame consists of $n+1$ subframes of $Ko+1$ symbols each. The last subframe of the $Z$ the block may consist of $(Ko+1)$ times the symbol 1 and each other subframe may consist of a group $Ko+1$ symbols (O, X, ... X). All subframes with the exception of the last subframe of each frame serve for the transmission of the $Ko$ information signals. The group of subframes formed by the last subframe of each of the first $Z$ frames serves for the transmission of the $Ko.Z$ signalling signals. For this synchronizing combination it applies that $\bar{d}o=\bar{d}_1=1$.

If by the multiplexing method described a higher order multiplex signal is formed from $K/Ko$ base multiplex signals of the type described, it applies to the synchronizing combination of the $K$-channel multiplex signal that: $do=1$ and $d_1=K/Ko$. In this particular case the multiplexing method applied is identical to the bit multiplexing method.

If for the comparison sequence during phase I of the synchronizing process there is chosen: $N=Ko$ the comparison sequence consists of $(Ko+1)$-times the symbol 1. With this choice of $N$, phase I of the synchronizing process starting from an arbitrary value $t_1$ of the time parameter $t$ finally always yields equality between the head of the selected $d_1$-divisional sequence and the comparison sequence, if no errors occur. The time limit may then be made inoperative.

Figure 4:
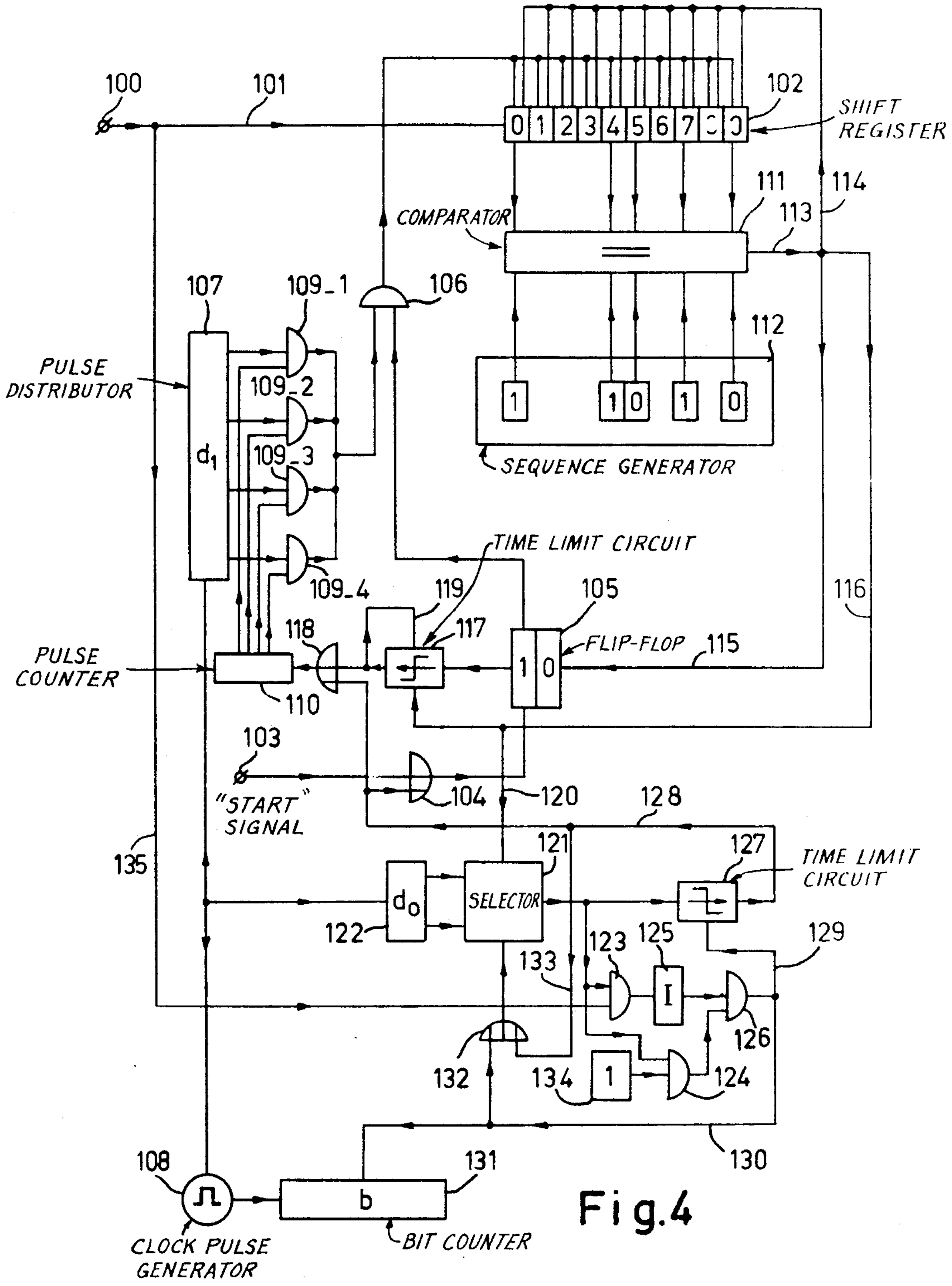
FIG. 4 shows apparatus for utilizing the method of the invention.

FIG. 4 shows an embodiment of a device for synchronizing a receiver to a bitstream divided into blocks and having a synchronization combination as illustrated in FIGS. 1 and 2.

The bitstream is received at the input terminal 100 and reaches through a conductor 101 the input of a shift register 102 having 10 stages: 0, 1 ... 9.

A signal for starting the synchronization process is applied to the starting terminal 103. This starting signal sets via the OR gate 104 the flip-flop 105 in the state 1. In this state the flip-flop 105 opens an AND gate 106 as a result of which a shift pulse sequence having a pulse repetition frequency of $f_b/d_1$ is applied to the shift register 102, in which $f_b$ is the bit frequency and $d_1=4$ (in this example).

The shift pulse sequence is derived from a cyclic pulse distributor 107, controlled by a clock pulse generator 108 having the bit frequency $f_b$. The pulse distributor 107 provides four shift pulse sequences shifted in time by one bit period, having the pulse repetition frequency $f_b/d_1$, at the four outputs connected to the AND gates 109–1, 109–2, 109–3 and 109–4. These AND gates are connected on the input side to a cyclic pulse counter 110 having four positions. In the position 1 the gate 109–1 is open, in, position 2 the gate 109–2 is open and so on. The cyclic pulse counter 110 has a given initial position. When the AND gate 106 is open, the shift pulse sequence corresponding to this initial position is applied to the shift register 102.

After the flip-flop 105 is set in state 1, the bits of a $d_1$-divisional sequence of the bitstream are shifted into the shift register 102.

The outputs of the stages 102–O, 102–4, 102–5, 102–7 and 102–9 are connected to a comparison device 111. The other side of the comparison device is connected to a device 112, which produces the comparison sequence. The bits 1 of this sequence are produced by the blocks in which a 1 is indicated and the bits 0 are produced by the blocks bearing a 0. The comparison device 111 compares the bit in the stage 102–0 with the bit 1 in the device 112, the bit in the stage 102–4 with the bit 1 in the device 112, the bit in stage 102–5 with the bit 0 in the device 112, the bit in stage 102–7 with the bit 1 in the device 112 and the bit in stage 102–9 with the bit 0 in the device 112. If in all these stages equality is found, a signal having the logical level 1 is produced across the conductor 113. The 1-signal at the conductor 113, when appearing, sets via the conductor 114 all stages of the shift register 102 in the state 0 and sets via the conductor 115 the flip-flop 105 in the state 0.

At the instant when the flip-flop 105 is set in the state 1, this flip-flop starts a time limit circuit 117. This time limit circuit provides after a given time limit an output signal having the logical level 1, which causes via the OR gate 118 the cyclic pulse counter 110 to pass on by one step. The output signal is furthermore fed back via the conductor 119 so that the time limit circuit is restarted.

The 1-signal at the conductor 113 drives via the conductor 116 the time limit circuit 117 into the rest position so that this circuit does not become operative when prior to the expiration of the time limit the comparison device 111 detects equality.

If the comparison device 111 does not detect equality before the time limit expires a shift pulse sequence shifted by one bit position is applied to the shift register 102. Thus another $d_1$-divisional sequence is inserted into shift register 102. If again no equality is stated prior to the time limit, the phase I of the synchronizing process is repeated with a different shift pulse sequence until equality is found for one or other $d_1$-divisional sequence.

When equality is detected, flip-flop 105 is set in the state 0 as described above and the time limit circuit 117 is changed over to the rest position.

The 1-signal of conductor 113 is applied, for starting phase II of the synchronizing process, via the conductors 116 and 120 to a bistable selector 121. To the selector 121 are applied two clock pulse sequences having the pulse repetition frequency $f_b/d_o(d_o=2)$ which are relatively shifted in time by one bit period. These clock pulse sequences are derived by a cyclic pulse distributor 122 from the clock pulse generator 108.

The clock pulses of bit frequency produced by the clock pulse generator 108 are indicated by the parameter $t$, which progresses through the series of natural numbers. This parameter $t$ is the same as that introduced above in the description. The clock pulse during which the comparison device 111 assesses equality is indicated by $t_o$. The symbol $A_{to}$ is located in the stage 102–0 of the shift register 102 and it applies that $A_t=1$. The selector 121 is controlled by the 1-signal of the comparison device 111 appearing during the clock pulse $t_o$ so that the sequence of clock pulses $t_o+d_o$, $t_o+2d_o$, ... is applied to the output. This sequence of clock pulses is applied to the AND gates 123 and 124. The incoming bitstream is supplied from the input terminal 100 via the conductor 135 to the AND gate 123. At the output of the AND gate 123 then appears a *do*-divisional sequence of the incoming bitstream. The first symbol appearing at the output of the AND gate 123 is the symbol $A_{t_0+d_0}$. Each bit appearing at the output of the AND gate 123 is inverted by the inverter 125 and applied to the AND gate 126. To the AND gate 124 is applied a 1-signal produced by the block 134, which signal corresponds to the value of the bit in the stage 102–0 of the shift register 102 at the instant when the comparison device 111 assesses equality. The output of the AND gate 124 is connected to the AND gate 126 so that during each clock pulse of the selector 121 a pulse of the bit value 1 is applied to the AND gate 126. When the inverted bit of the bit current applied by the inverter 125 to the AND gate 126 is has the value 1, a 1-signal appears at the output of the AND gate 126.

The first clock pulse of the selector 121 starts a time limit circuit 127. This supplies after expiration of a given time limit a 1-signal, which sets via the conductor 128 and AND gate 104 the flip-flop 105 in the state 1 and steps the cyclic pulse counter 110 by one step via the conductor 128 and the OR gate 118. When this 1-signal appears, the synchronization process is repeated, starting by phase I.

When the AND gate 126 supplies a 1-signal prior to the time limit of the circuit 127, this 1-signal sets via the conductor 129 the time limit circuit in the rest position, so that this circuit cannot become operative. The 1-signal of the AND gate 126 sets via the conductor 130 the bitcounter 131 controlled by the clock pulse generator 108 and having the counting capacity $b(b=40)$, in the initial position corresponding to the beginning of a block of the bitstream. The bitcounter 131 is thus synchronized to the blocks of the bitstream and indicates for each incoming bit the position in the block.

The 1-signal of the AND gate 126 sets the selector 121 in the rest position via the conductor 130 and the OR gate 132. When phase II of the synchronizing process is terminated because the time limit circuit 127 becomes operative, the 1-signal thereof sets the selector 121 in the rest position via the conductors 128 and 133 and the OR gate 132.

Figure 5:
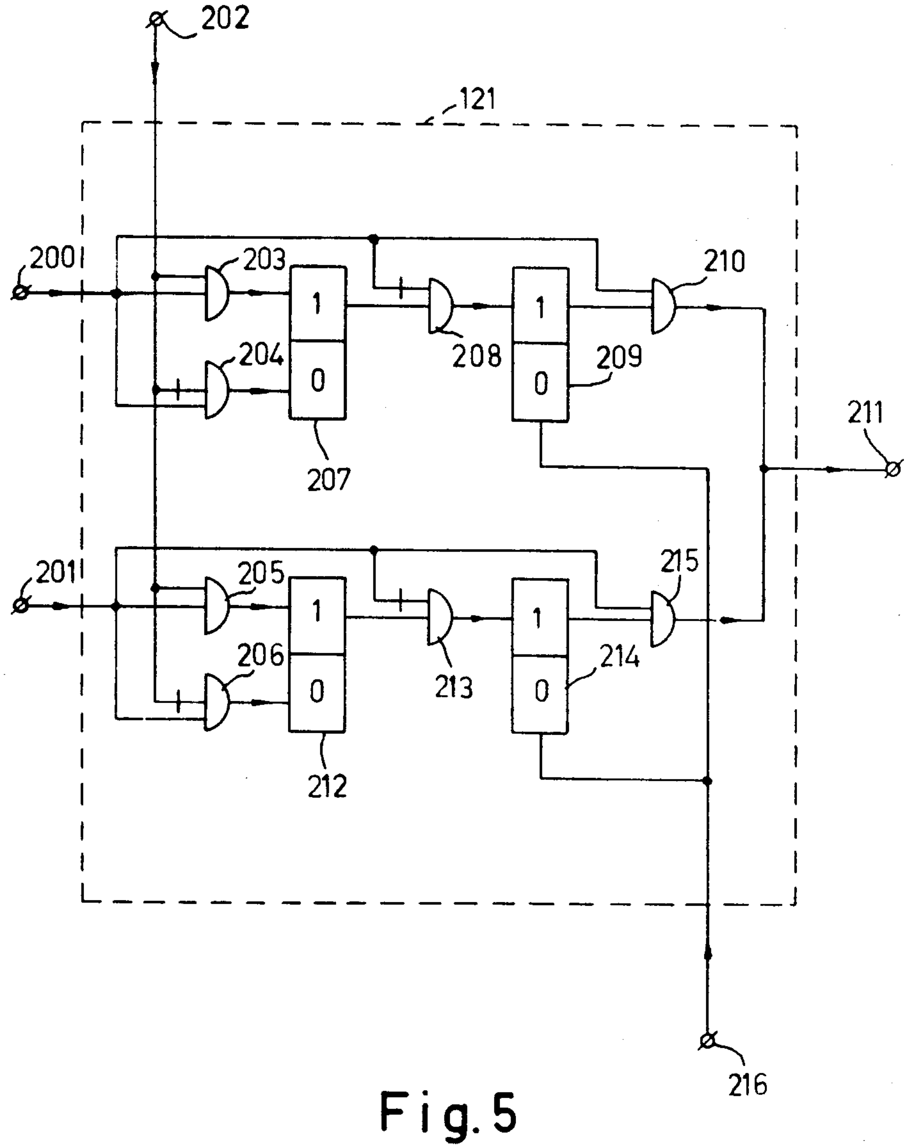
FIG. 5 shows an element of the apparatus in more detail.

FIG. 5 shows an embodiment of the selector 121. To the terminals 200 and 201 are applied two clock pulse sequences shifted by one bit period and having the pulse repetition frequency $f_b/d_o$ ($d_o$=*A*2). To the terminal 202 is applied the 1-signal from the comparison device 111, which signal coincides with a clock pulse of one of the two clock pulse sequences at the terminals 200 and 201. The clock pulse sequence of the terminal 200 is applied to the AND gates 203 and 204. The clock pulse sequence of the terminal 201 is applied to the AND gates 205 and 206. The signal of terminal 202 is applied to the AND gates 203 and 205 and after inversion it is applied to the AND gates 204 and 206. The signal inversion is indicated in the Figure by a transverse dash.

If the 1-signal of terminal 202 coincides with a clock pulse of the terminal 200, the AND gate 203 supplies a 1-signal. This 1-signal sets the flip-flop 207 in the state 1. The inverted clock pulse of the terminal 200 then sets via the AND gate 208 the flip-flop 209 in the state 1. The flip-flop 209 opens the AND gate 210 so that beginning by the next-following clock pulse the clock pulse sequence of the terminal 200 is applied to the output terminal 211. During this next-following clock pulse the AND gate 204 supplies a 1-signal which sets the flip-flop 207 in the state 0.

When the 1-signal of the terminal 202 coincides with a clock pulse of the terminal 201, this clock pulse sets via the AND gate 205 the flip-flop 212 in the state 1 and the inverted clock pulse then sets via the AND gate 213 the flip-flop 214 in the state 1. In this state the flip-flop 214 opens the AND gate 215, so that beginning by the next-following clock pulse the clock pulse sequence of the terminal 201 is applied to the output terminal 211. During this next-following clock pulse the AND gate 206 supplies a 1-signal, which sets the flip-flop 212 in the state 0.

A 1-signal applied to the terminal 216 sets the flip-flop 209 or 214 in the state 0 depending upon which of them is in the state 1.

It should be noted that for constructing a synchronization device for a multiplex bitstream only the number of outputs and hence the number of stages of the cyclic pulse distributor 107 and of the cyclic pulse counter 110 in the device described above have to be adapted accordingly. In the example given $d_1$=4 and the number of outputs is 4. If *n* bitstreams are multiplexed, $d_1$ increases *n*-times and the number of outputs of the devices 107 and 110 has to be raised by the factor *n*.

It should furthermore be noted that since *b* can be divided by $d_1$ the cyclic pulse distributor 107 may be combined with the first stage of the bit counter 131. This bit counter is provided in each receiver and is not associated with the synchronization device proper. The extension of the synchronization device for a multiplex bitstream is then restricted to the cyclic pulse counter 110 and the gates controlled thereby.

What I claim is:

1. A method of synchronizing a receiver to a bitstream divided into blocks having a constant number of bits, each block having at least two different synchronizing bits arranged in a synchronization bit pattern periodically repeated from block to block, characterized in that the synchronization process is divided into two distinct time-successive phases, which first phase includes the steps of
   - selecting from an arbitrary bit position in the bitstream a first divisional sequence consisting of a series of bits lying spaced apart by equal first distances in the bitstream,
   - temporarily storing each bit associated with the first divisional sequence,
   - comparing after each selection of a bit of the first divisional sequence the portion of said first divisional sequence which is formed by a predetermined number of most recently selected bits with a locally produced comparison sequence until equality is found between said portion of the first divisional sequence and the comparison sequence,
   - in the event that equality is not found within a given first time limit, repeating the first phase from a bit position associated with a different first divisional sequence, so that, if constantly within said first time limit no equality is found the various possible first divisional sequences are selected in cyclic order of succession on the understanding that if only one first divisional sequence is possible said first time limit is rendered inoperative, and
   - in the event that equality is found within said first time limit, starting the second phase of the synchronization process which includes the steps of
   - selecting from the bit position of the most recently selected bit of the portion of the first divisional sequence which corresponds with the comparison sequence a second divisional sequence consisting of a series of bits spaced apart by equal second distances in the bitstream,
   - comparing each bit of the second divisional sequence with the last-mentioned, most recently selected bit of the first divisional sequence until for the first time inequality is found, and
   - in the event that inequality is not found within a given second time limit, repeating the synchronization process starting with the first phase, and
   - in the event inequality is found for the first time within said second time limit, synchronizing the receiver to a bit position which has a predetermined position relative to the bit position of the second divisional sequence in which the inequality is found.